April 3, 1934.  W. C. STARKEY  1,953,370
SPRING CLUTCH
Filed Jan. 7, 1931
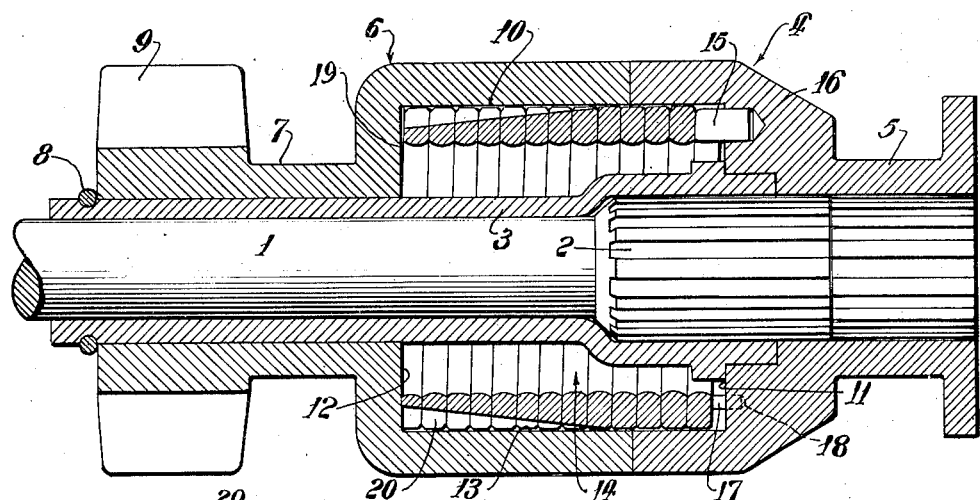
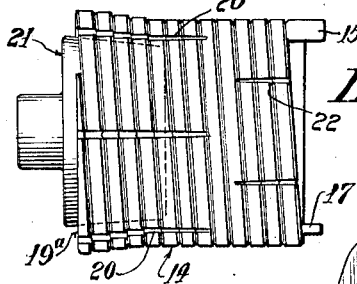
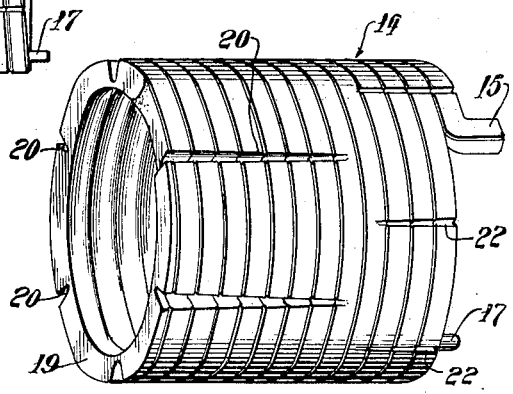
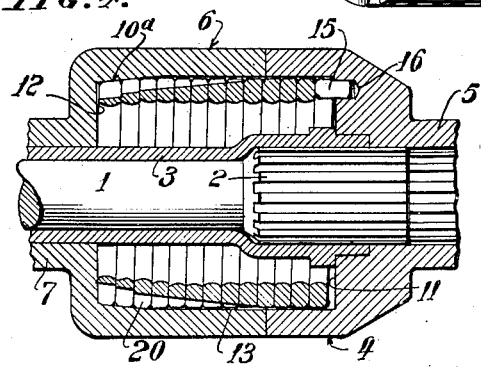
Inventor:
William C. Starkey,
By: Arthur W. Wilmore
Atty.

Patented Apr. 3, 1934

1,953,370

UNITED STATES PATENT OFFICE

1,953,370

SPRING CLUTCH

William C. Starkey, Indianapolis, Ind., assignor to L. G. S. Devices Corporation, Indianapolis, Ind., a corporation of Indiana Application January 7, 1931, Serial No. 507,062

10 Claims. (Cl. 192—41)

This invention relates to improvements in spring clutches and it consists of the matters hereinafter described and more particularly pointed out in the appended claims.

The invention is of especial advantage in that type of clutch embodying two coaxial, cup shaped members adapted to receive a helical spring, which in a relative rotation of said members in one direction, freely permits such rotation but which in a relative rotation of said members in the other direction acts to clutch said members together.

Heretofore, many expedients have been tried to energize the spring from its unanchored end whereby said end is held in the unwinding of the spring to expand the same into clutching engagement with the cup members. In some expedients, certain extra elements were employed for this purpose but said elements increase the cost of manufacture and have other disadvantages which the present invention seeks to avoid.

The primary object of the invention is to provide a clutch of this kind, wherein the end turns or coils at the unanchored end of the spring assume only a small percentage of the load to be held and each consecutive turn or coil toward the middle of the spring assumes a successively greater percentage of said load until that turn or coil is reached that crosses the plane of the meeting ends of the cup shape members and which turn or coil assumes the entire load.

Another object of the invention is to provide a spring for a clutch of this kind which is easy to make and which although made of stock of the same cross sectional area throughout its length is rendered more flexible at one end by the provision of a plurality of axially extending gradient grooves in several of the turns or coils of said end of the spring.

These objects of the invention as well as others, together with the many advantages thereof will more fully appear as I proceed with my specification.

In the drawing:—

Fig. 1 is a longitudinal vertical sectional view through a spring clutch embodying the desired form of my invention.

Fig. 2 is a perspective view of a spring for a clutch of this kind and with which my invention is more particularly concerned.

Fig. 3 is a view in side elevation of a slightly modified form of clutch spring embodying my invention and which will be described in more detail later.

Fig. 4 is a fragmentary longitudinal sectional view through a modified form of clutch embodying my invention and which will be described in more detail later.

The invention is herein illustrated and is herein described as embodied in the pinion unit of an engine starter but this is to be considered illustrative of only one practical embodiment thereof because the invention is also applicable to spring clutches for other purposes as is apparent.

Referring now in detail to that embodiment of the invention illustrated in Figs. 1 and 2 of the accompanying drawing:—1 indicates as a whole the driven shaft of an automobile or like engine starting motor, having a splined part 2 of enlarged diameter at that end remote from said motor. On said shaft is mounted a bearing sleeve or bushing 3. A cup shaped clutch member 4 is provided at one end with a hub 5 having a splined connection with the like part 2 of the shaft 1.

A second clutch member 6 has a hub 7 at one end that is journalled on the sleeve 3 and is held against an endwise movement in one direction thereon by a spring retaining ring 8 suitably engaged in an annular groove in said sleeve. On said hub is formed the pinion 9 which in an endwise movement of both cup shaped members toward the starting motor is adapted to be moved into engagement with the fly wheel ring gear (not shown) of the engine to be started.

Both cup shaped members are formed at their abutting ends to provide a clutch spring recess 10 having flat ends 11 and 12 respectively and an annular clutch surface 13.

In said recess is located a clutch spring 14 of an exterior diameter when in its normal unstressed condition, approximating that of surface 13.

That turn or coil of the spring associated with the end 11 of the recess is turned axially to form a toe 15 adapted for engagement in a pocket 16 formed in the member 4 and opening through the flat end of said recess. Preferably this turn or coil of the spring is also provided with one or more axially extending studs 17 adapted for engagement in an associated pocket or pockets 18 in end 11 of the recess.

That turn or coil 19 at the other end of the spring is ground flat for engagement with the end 12 of the recess and is devoid of any toe or studs such as is associated with the first mentioned end of the spring.

In the second mentioned end of the spring which is in fact the energizing end thereof, I provide in one surface of the spring a plurality of longitudinally extending gradient grooves 20, which are deepest at that end opening through the turn or coil 19 and gradually decrease in depth toward the middle turn or coil of the spring. Preferably these grooves terminate short of the plane of the meeting ends of the two cup shaped members 4 and 6 as best shown in Fig. 1 and preferably these grooves are in the exterior surface of the spring, because of the ease in which they can be produced therein.

As shown herein I provide six of such grooves, spaced equal arcuate distances apart. Thus with such a spring the endmost turn or coil is, relatively speaking, the most flexible one of the spring and this flexibility decreases in the successive turns or coils until the last turn or coil having the shallowest end of the grooves therein, is reached.

Thus as these slots become more and more shallow, the various turns retain greater percentage of their total rigid strength until where the slots run out or disappear, the turns or coils retain their full strength and rigidity.

In the relative rotation between the cup members 4 and 6 shown in Fig. 1, as when the member 4 is being driven by the shaft 1 in the proper direction, said member will through the toe 15 and stud 17 tend to turn the spring in a direction tending to unwind the same.

As the opposite end of the spring is the most flexible one, because of the arrangement of the slots as before described, it is apparent that the turn or coil 19 will be the first one to be affected thereby and radially expanded, and then the next one and so on until all of those turns or coils having portions of the grooves therein will be expanded into engagement with that part of the surface 13 near said end 12. Thus the turn or coil 19 will assume only but a small part or percentage of the total load, each successive turn or coil assuming a successively greater part of the total load until that coil is reached which crosses the plane of the meeting ends of the cup members wherein said total load is assumed.

Thus in the spring structure mentioned the slots have in no manner decreased the total load value of the spring because the end turn or coil 19 from a standpoint of proper functioning would not need a cross sectional area of that turn that crosses said plane of the meeting ends of the cup members to retain the full capacity of the spring.

Again, this end of the spring with its flexibility has another advantage in that only a light overrun or frictional drag is had and this would still be true even though the end turn or coil be several thousandths of an inch oversize with respect to the diameter of the recess 10.

Instead of the spring being of the same diameter from end to end as shown in Figs. 1 and 2, the unanchored end may be of a different diameter, either smaller or greater than the remainder of the spring and yet have the light overrunning characteristics desired. In Fig. 3 is shown a spring wherein the endmost turn or coil 19ª is several thousandths of an inch larger than those at the other end which are made of a diameter approximating that of the recess. Thus the endmost turn or coil 19ª may be .015" greater than that of the recess in which it is used, the next turn being .010" over recess size and the third turn or coil being .005" over recess size.

This relative diameter of the turns or coils at the unanchored end of the spring with respect to the recess diameter may be secured in two different ways. In the case of the spring shown in Fig. 3, these turns or coils at the unanchored end may be made by actually expanding them simply by driving a taper mandrel 21 thereinto until these turns or coils take on a permanent set.

Again, the same result may be attained by leaving the spring perfectly cylindrical on its exterior surface and by tapering one end of the recess as at 10ª in Fig. 4.

In grinding flat that end of the spring shown in Figs. 1 and 2, embodying the turn 19, said turn presents but a narrow contact surface for engagement with the cylindrical wall of the recess near the associated end which insures cutting through the lubricant film on the end surface 12 of the recess to make a better metal to metal contact between said end turn or coil and said end surface and makes positive a better grip for said end when the spring is rotated in the proper direction.

Again, these grooves have other advantages as they not only offer space into which the film of lubricant which is wiped off the surface 13 can enter when the spring is approaching its full locking or clutching condition, but the relatively sharp edges of the grooves present a series of scraping edges that cut the film of oil from the cylindrical pocket, thus leaving a metal to metal condition or engagement of spring and recess, which insures a high coefficient of friction and a more positive locking effort.

As is shown in Fig. 2, similar slots 22 may be formed in the anchored end of the spring and these slots terminate short of the turn that would cross the plane of the meeting ends of the cup members 4 and 6. These slots are disposed in the exterior of the spring, in planes between those of the slots 20 and at their deepest part would be only about one half the depth of said slots 20 and would taper out to nothing at their other ends.

This would cause the anchored end turn or coil to be slightly more resilient but would not detract from its compression strength and would insure its coming into positive intimate contact with the end of the recess so that these three or more turns in a shallow recess, will quickly and efficiently assume a locking position and help take the strain off the toe 15, and lugs 17. Again, these grooves provide more space to receive the lubricant that is wiped off the surface 13 as the spring starts to assume its locking condition or position.

By reason of the slots in the free or energizing end of the spring, the rigid or stiff condition not desired at this end of the spring when the turns or coils are made of substantially large cross sectional stock, is changed to one of the desired flexibility for the intended purpose.

Heretofore, in a spring without such a flexible end, it was not practical to have the same more than .003" or .004" over that of the diameter of that part of the recess engaged thereby in the case of overrunning clutches because of great overrun friction. On the other hand, with this end of the spring, but a few thousandths oversize, said limited oversize and relatively heavy toe pressure, due to the stiffness of the spring would quickly wear down this end of the spring through overrunning friction in a relative movement between the cup members in the proper direction.

In making the spring described, modern spring making practice is followed. Thus the spring may be made of stock of uniform cross section, wound and ground in the usual manner after which it is slotted exteriorly as shown.

While in describing the invention, I have referred in detail to the form, arrangement and construction of the parts thereof, the same is to be considered as illustrative only so that I do not wish to be limited thereto except as may be specifically set forth in the appended claims.

I claim as my invention:—

1. A spring clutch embodying therein two

1. A spring clutch embodying therein two relatively rotatable coaxial members formed to provide a recess therein with a clutching surface and a coil spring in said recess and engaged at its ends with the ends thereof, said spring being formed in desired coils thereof with grooves that increase the flexibility thereof over that of the other coils, said desired coils in a relative rotation of said members in one direction changing their diameter and clutching against a part of said surface so that further relative rotation of said members in the same direction will act to change the diameter of said other coils of the spring to clutch said two members together.

2. A spring clutch embodying therein two relatively rotatable coaxial members formed to provide a recess therein with a clutching surface and a coil spring in said recess and engaged at its ends with the ends thereof, said spring being formed in desired coils at one end of the spring with grooves to increase the flexibility of said end of the spring over the remainder thereof, said end of the spring in a relative rotation of said members in one direction changing its diameter to clutch against a part of said surface so that further relative rotation of said members in the same direction will act to change the diameter of the remainder of the spring to clutch said two members together.

3. A spring clutch embodying therein two relatively rotatable coaxial members formed to provide a recess with an annular interior clutching surface and a coil spring in said recess and engaged at its ends with the ends thereof, said spring being formed in desired coils thereof with grooves that increase the flexibility thereof over that of the other coils, said desired coils in a relative rotation of said members in one direction, expanding radially to clutch against a part of said surface so that further relative rotation of said members in the same direction will radially expand the other coils of the spring to clutch said two members together.

4. A spring clutch embodying therein two relatively rotatable coaxial members formed to provide a recess with an annular interior clutching surface and a coil spring in said recess and engaged at its ends with the ends thereof, said spring being formed in desired coils at one end of the spring with grooves that increase the flexibility of said end of the spring over the remainder thereof, said end of the spring in a relative rotation of said members in one direction expanding radially to clutch against a part of said surface so that further relative rotation of said members in the same direction will raddially expand the remainder of the spring to clutch said two members together.

5. A spring clutch embodying therein two relatively rotatable coaxial members formed to provide a recess with an annular interior clutching surface and a coil spring in said recess and engaged at its ends with the ends thereof, said spring being formed in the coils at one end thereof with a plurality of gradient longitudinally extending grooves to increase the flexibility of said end of the spring over that of the remainder of said spring, said end of the spring in a relative rotation of said members in one direction radially expanding to clutch against a part of said surface previous to the clutching of the remainder of said spring with the other part of said surface.

6. A spring clutch embodying therein two relatively rotatable coaxial members formed to provide a recess with an annular interior clutching surface and a coil spring in said recess and engaged at its ends with the ends thereof, said spring being formed in the exterior of the coils at one end thereof with a plurality of longitudinally extending gradient grooves to increase the flexibility of said end of the spring over that of the remainder of said spring, said end of the spring in a relative rotation of said members in one direction radially expanding to clutch against a part of said surface previous to the clutching of the remainder of said spring with the other part of said surface.

7. A spring clutch embodying therein two relatively coaxial members meeting end to end and formed to provide a recess therein with an annular interior clutch surface, a coiled spring in said recess, and means providing an anchorage for one end of the spring with one end of said recess, the other end of said spring operatively engaging with the other end of said recess, therein being a plurality of arcuately spaced, longitudinally extending grooves in said last mentioned end of the spring that are the deepest at the extremity thereof and terminate short of the plane of the meeting ends of said coaxial members where said grooves are the shallowest, said grooves imparting greater flexibility to the last mentioned end of the spring in a relative movement of the said members in one direction and expanding radially to clutch against a part of said surface previous to the clutching of the first mentioned end of said spring.

8. A spring clutch embodying therein, two relatively rotatable coaxial members formed to provide a recess therein with a clutching surface and a coil spring in said recess and engaged at its ends with the ends thereof, said spring embodying a plurality of coils, all made of stock of the same cross sectional area throughout and certain of said coils having grooves in that surface adapted to engage the clutching surface of said recess, to make them more flexible than the other coils of the spring.

9. A spring clutch embodying therein, two relatively rotatable clutch members and a clutch spring havng a porton so operatively connected to one of said members as to be rotative therewith, the other of said members having an internal surface arranged to be gripped by said coil spring upon a radial expansion of said spring, said spring including a plurality of coils all made of stock of the same cross sectional area and certain of said coils having grooves in that surface adapted to grip said internal surface of said other of said members, to make said coils more flexible than the other coils of the spring.

10. A spring clutch embodying therein, two relatively rotatable clutch members and a clutch spring formed at one end to so engage with a part of one of said clutch members as to rotate therewith, the other of said clutch members having a clutch surface arranged to be gripped by said spring upon a change in its diameter, the coils in the other end of the spring having grooves in their external surface to increase the flexibility of said coils over the coils at the first mentioned end of the spring.

WILLIAM C. STARKEY.